(12) United States Patent
Kuyler et al.

(10) Patent No.: US 11,285,540 B2
(45) Date of Patent: Mar. 29, 2022

(54) METHOD FOR MANUFACTURING PARTS OR DEVICES AND FORMING TRANSITION LAYERS FACILITATING REMOVAL OF PARTS AND DEVICES FROM BUILD-PLATES

(71) Applicant: Warsaw Orthopedic, Inc., Warsaw, IN (US)

(72) Inventors: Adriaan J. Kuyler, Germantown, TN (US); Dawin A. Rodriguez Santiago, Hernando, MS (US); Keith Miller, Germantown, TN (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 160 days.

(21) Appl. No.: 16/812,238

(22) Filed: Mar. 6, 2020

(65) Prior Publication Data
US 2021/0276089 A1  Sep. 9, 2021

(51) Int. Cl.
*B22F 10/00* (2021.01)
*B22F 10/10* (2021.01)
*B33Y 10/00* (2015.01)

(52) U.S. Cl.
CPC .............. *B22F 10/00* (2021.01); *B22F 10/10* (2021.01); *B33Y 10/00* (2014.12)

(58) Field of Classification Search
CPC .......... B22F 10/00; B22F 10/10; B22F 10/28; B22F 10/40; B22F 10/47; B33Y 10/00
See application file for complete search history.

(56) References Cited

U.S. PATENT DOCUMENTS

| | | |
|---|---|---|
| 4,863,538 A | 9/1989 | Deckard |
| 5,192,559 A | 3/1993 | Hull et al. |
| 5,460,758 A | 10/1995 | Langer et al. |
| 5,593,531 A | 1/1997 | Penn |
| 5,595,703 A | 1/1997 | Swaelens et al. |
| 5,985,202 A | 11/1999 | Ozaki et al. |
| 6,042,774 A | 3/2000 | Wilkening et al. |
| 7,084,370 B2 | 8/2006 | Hagemeister et al. |
| 8,021,138 B2 | 9/2011 | Green |
| 2002/0145213 A1 | 10/2002 | Liu et al. |
| 2008/0036117 A1* | 2/2008 | Hickerson ............. B33Y 30/00 264/405 |
| 2014/0303942 A1 | 10/2014 | Wighton et al. |
| 2016/0009039 A1 | 1/2016 | Blanchet |
| 2016/0052205 A1 | 2/2016 | Frantzdale |
| 2016/0107234 A1 | 4/2016 | Craeghs et al. |

(Continued)

FOREIGN PATENT DOCUMENTS

| | | |
|---|---|---|
| JP | 2016-533571 | 10/2016 |
| WO | 2010007394 | 1/2010 |
| WO | 2014208743 | 12/2014 |

*Primary Examiner* — Michael P Wieczorek

(57) ABSTRACT

A method for manufacturing parts or devices using additive manufacturing is provided. The method forms the parts or devices, and also forms a transition layer or transition layers of partially or incompletely sintered powder between a build-plate and/or supports provided on the build-plate, and/or a gap or gaps of unsintered powder, or partially or incompletely sintered powder between the supports and the parts. The transition layer(s) and the gap(s) facilitate separation of the parts or devices from the build-plate or the supports provided on the build-plate.

14 Claims, 8 Drawing Sheets

(56) References Cited

U.S. PATENT DOCUMENTS

| | | |
|---|---|---|
| 2016/0107390 A1 | 4/2016 | Davis et al. |
| 2016/0144428 A1 | 5/2016 | Mironets et al. |
| 2016/0175932 A1* | 6/2016 | Dimter .................... B22F 10/40 419/28 |
| 2016/0207260 A1 | 7/2016 | Lee et al. |
| 2017/0232511 A1 | 8/2017 | Fieldman et al. |
| 2017/0232512 A1 | 8/2017 | Joerger |
| 2017/0232670 A1 | 8/2017 | Joerger et al. |
| 2017/0232671 A1 | 8/2017 | Fieldman |
| 2017/0232672 A1 | 8/2017 | Fieldman et al. |
| 2017/0232682 A1 | 8/2017 | Alcantara Marte et al. |
| 2017/0232683 A1 | 8/2017 | Alcantara Marte et al. |
| 2017/0326815 A1 | 11/2017 | Stevenson et al. |
| 2018/0029306 A1 | 2/2018 | Gold et al. |
| 2018/0111334 A1 | 4/2018 | Gold et al. |
| 2018/0154441 A1* | 6/2018 | Miller .................... B29C 64/40 |

* cited by examiner

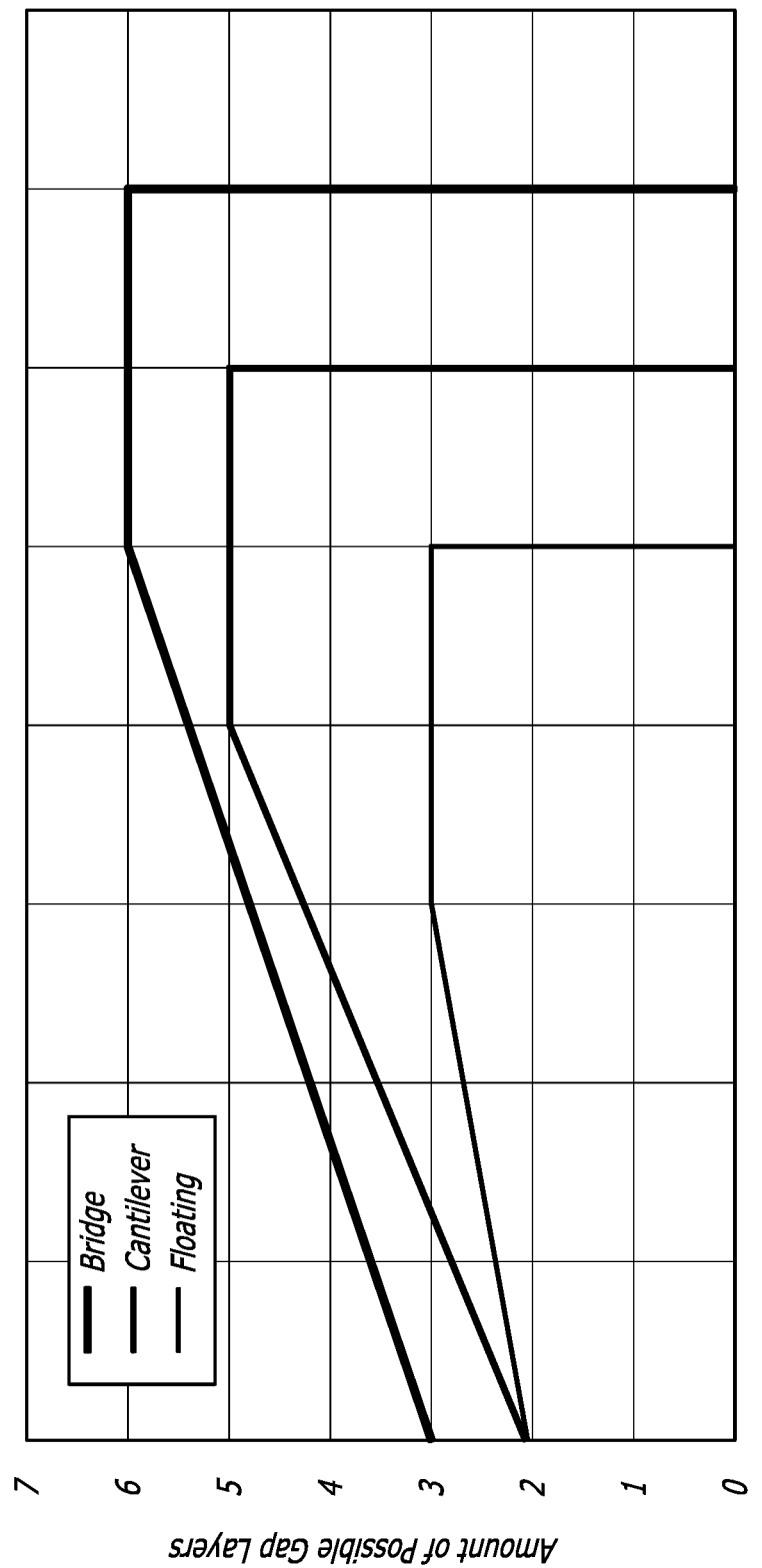

METHOD FOR MANUFACTURING PARTS OR DEVICES AND FORMING TRANSITION LAYERS FACILITATING REMOVAL OF PARTS AND DEVICES FROM BUILD-PLATES

FIELD

The present technology is generally related to use of additive manufacturing processes in forming parts or devices, and forming a transition layer or transition layers of partially or incompletely sintered powder, and a gap or gaps of unsintered power, or of partially or incompletely sintered powder to facilitate separation of the parts or devices from a build-plate and/or supports provided on the build-plate.

BACKGROUND

Additive manufacturing processes have been used to form parts or devices. These parts or devices can be formed on build-plates and/or supports provided on the build-plates. For example, laser sintering can be used to form the parts or devices on the build-plates and/or the supports. However, using additive manufacturing can create challenges when attempting to remove the parts or devices from the build-plates and/or the supports. When forming the parts or devices, a connection is formed between the devices or parts and the build-plates and/or the supports. To illustrate, the connection can be machined away and/or the connection can be thinned and/or perforated (or otherwise weakened) to facilitate removal of the parts or devices from the build-plates and/or the supports. Either way, the surface or surfaces of the parts or devices resulting from such removal are oftentimes inconsistent. Therefore, there is a need for features and methods for forming and using the features that facilitate removal of parts or devices from build-plates and/or supports provided on the build-plates.

SUMMARY

The techniques of this disclosure generally relate to use of additive manufacturing processes employing laser sintering to form parts or devices, and to form a transition layer or transition layers and/or a gap or gaps of unsintered powder, or of partially or incompletely sintered powder to facilitate ease of separation of the parts or devices from a build-plate and/or supports provided on the build-plate.

In one aspect, the disclosure provides a method of forming a part or device, the method including providing a build-plate having an upper surface; depositing a first set of one or more layers of powdered metal on the upper surface of the build-plate; solidifying an upper portion of the first set of one or more layers of powdered metal to form a first solid layer, and forming a transition layer from a lower portion of the first layer of powdered metal by leaving the lower portion of the first set of one or more layers of powdered metal partially/incompletely solidified; after formation of the first solid layer, depositing a second set of one or more layers of powdered metal on an upper surface of the first solid layer; solidifying the second set of one or more layers of powdered metal to form a second solid layer attached to the first solid layer; after formation of the second solid layer, depositing a third set of one or more layers of powdered metal on an upper surface of the second solid layer; solidifying the third set of one or more layers of powdered metal to form a third solid layer attached to the second solid layer; and removing the part or device formed by the first solid layer, the second solid layer, and the third solid layer by separating the part or device from the build-plate at the transition layer, where the transition layer eases separation of the part or device from the build-plate In another aspect, the disclosure provides a method of forming a part or device, the method including providing a build-plate having a first upper surface; depositing a first set of one or more layers of powdered metal on the first upper surface of the build; solidifying a first portion of the first set of one or more layers of powdered metal into a first solid layer formed as a vertical portion; solidifying a second portion of the first set of one or more layers of powder metal into a support provided adjacent the vertical portion; depositing a second set of one or more layers of powdered metal on the vertical portion and an upper surface of the support; solidifying a first portion of the second set of one or more layers of powdered metal adjacent the vertical support to form a first portion of a second solid layer attached to the vertical portion, forming a transition layer from a second portion of the second set of one or more layers of powdered metal adjacent the support by leaving the second portion of the second set of one or more layers of powdered metal partially/incompletely solidified, and solidifying a third portion of the second set of one or more layers of powder metal adjacent the first portion of the second solid layer and adjacent the transition layer to form a second portion of the second solid layer attached to the first portion of the second solid layer and supported by the transition layer; after formation of the second solid layer, depositing a third set of one or more layers of powdered metal on an upper surface of the second solid layer; solidifying the third set of one or more layers of powdered metal to form a third solid layer attached to the second solid layer; and removing the part or device formed by the vertical portion, the first solid layer, the second solid layer, and the third solid layer by separating the part or device from the support at the transition layer, where the transition layer eases separation of the part or device from the support In yet another aspect, the disclosure provides a method of forming a part or device, the method including providing a build-plate having a first upper surface; depositing a first set of one or more layers of powdered metal on the first upper surface of the build-plate; solidifying a first portion of the first set of one or more layers of powdered metal into a first solid layer formed as a vertical portion; solidifying a second portion of the first set of one or more layers of powdered metal into a support provided adjacent the vertical portion; depositing a second set of one or more layers of powdered metal on the vertical portion and an upper surface of the support; forming a transition layer from a first portion of the second set of one or more layers of powdered metal by leaving the first portion of the second set of one or more layers of powdered metal partially/incompletely solidified; solidifying a second portion of the second set of one or more layers of powdered metal to form a first portion of a second solid layer above and attached to the first solid layer; solidifying a third portion of the second set of one or more layers of powdered metal to form a second portion of the second solid layer above the transition layer, and adjacent and attached to the first portion of the second solid layer; and removing the part or device formed by the vertical portion, the first solid layer, and the second solid layer by separating the part or device from the support at the transition layer, where the second solid layer of the second set of one or more layers of powdered metal is cantilevered over the support by the vertical portion, and the transition layer eases separation of the part or device from the support.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 8 is a graphical depiction of a relationship between surface area of the part(s) or device(s) hanging over support(s) and a possible number of the transition layer(s) for a part or device for different part/device configurations.

DETAILED DESCRIPTION

Figure 1:
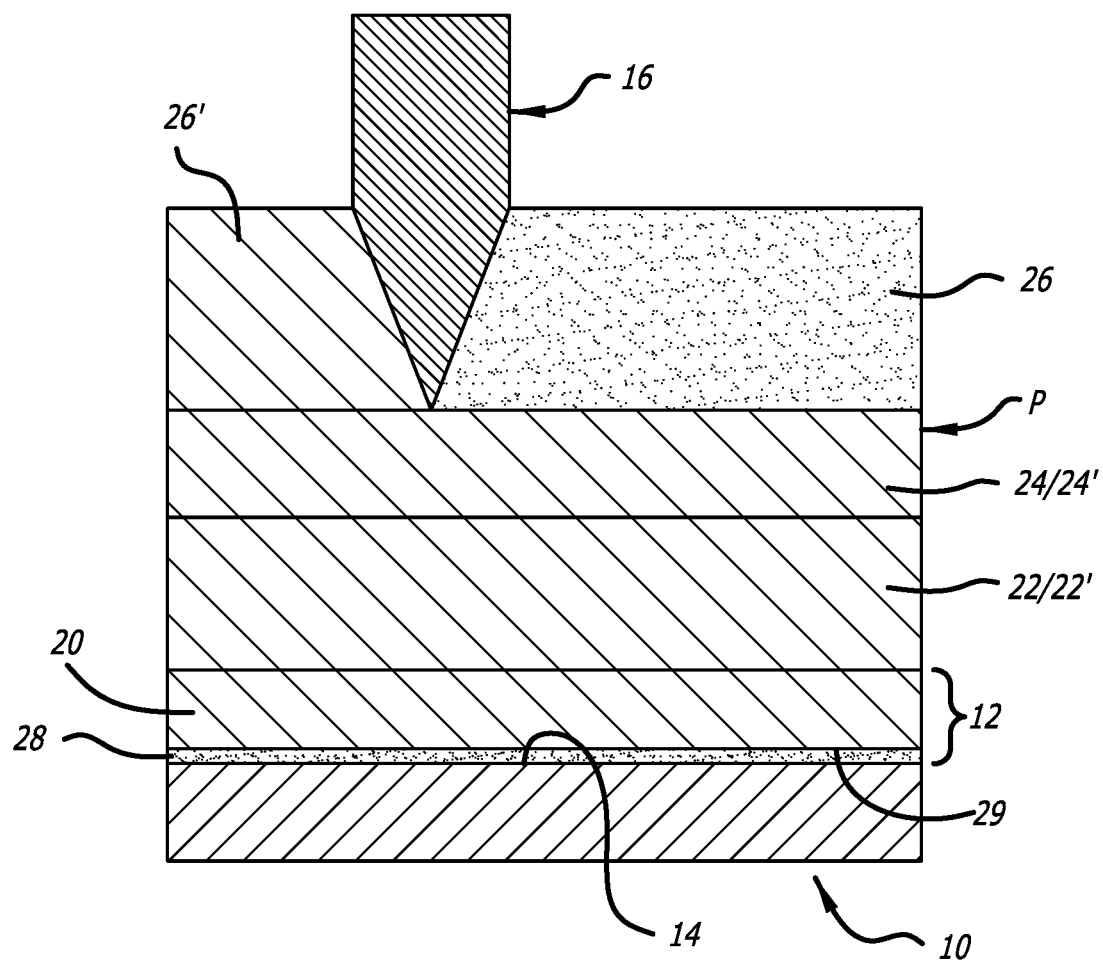
FIG. 1 is a side, cross-sectional view that illustrates an additive manufacturing process using laser sintering to form on a build-plate a first part or device including completely sintered layers of powder, and a transition layer of powder to facilitate removal of the device or part from the build-plate.

Additive manufacturing (or machining) processes such as, for example, laser metal additive manufacturing can be used in forming various constructs (such as a part or device P) on an additive build-plate generally indicated by the numeral 10 in FIGS. 1-7. The laser metal additive manufacturing can be used to incrementally add layers to the build-plate 10 via a vertical build direction, and these incrementally-added layers can be used to ultimately form various constructs (such as, for example, the part or device P in FIG. 1 and the supports in FIGS. 2-7). Using the laser metal additive manufacturing, a layer of powder (e.g., powdered metal such as titanium) 12 is first deposited on an upper surface 14 of the build-plate 10, and then a laser 16 is used to laser sinter the layer of powder 12 to solidify the layer of powder 12. As depicted in FIG. 1, solidifying the layer of powder 12 via laser sintering can create a solid layer 20 of the part P. An iterative process can then similarly repeat the depositing and then laser sintering of additional layers of powder. To illustrate, depositing of additional layers of powder 22, 24, and 26 and then laser sintering of layers of powder 22, 24, and 26 can be repeatedly used to form additional solid layers 22', 24', and 26' of the part P. The layers of powder 12, 22, 24, and 26 and the below-discussed layers of powder can be sintered individually or multiple layers can be sintered together. The vertical depths of each of the layers of powder 12, 22, 24, and 26 (as well as of the below-discussed layers of powder) can be uniform, but can be different as between the layers of powder 12, 22, 24, and 26 (as well as between the below-discussed layers of powder). The uniform vertical depths, for example, can be selected from between approximately 30 microns to approximately 60 microns.

As discussed below, a transition layer or layers can be used to facilitate separation of various parts (including the part P) from the build-plate 10. The transition layer or layers can be formed via solidifying various layers of powder and leaving a layer or layers of the powder partially/incompletely unsolidified. To illustrate, when using laser metal additive manufacturing, the laser 16 can be used to leave a transition layer or layers 28 of the layer of powder 12 adjacent the build-plate 10 or other support partially/incompletely sintered. When using the laser 16, the heat of laser 16 is applied to the layer of powder 12 to facilitate sintering to form the solid layer 20 of the part P. The penetration of the heat into the layer of powder 12 decreases as the depth of the layer of powder 12 increases. Thus, application the laser 16 can be configured to both sinter most of layer of powder 12 into the solid layer 20 using the heat from the laser 16, and avoid complete sintering (or melting) of the transition layer(s) 28.

Because the transition layer(s) 28 is partially/incompletely sintered (or melted) to the build-plate 10, the layer 20 is not securely attached to the build-plate 10 at the transition layer 28. As such, the transition layer(s) 28 allows the part P to be more easily separated from the build-plate 10. If necessary, a small connection (not shown) between the build-plate 10 and the solid layer 20 can be formed by completely solidifying a portion of the powder used to form the transition layer(s) 28, and the connection can be used to hold the layers 20', 22', 24', and 26' as the part P is being formed. Similar connections can be formed in the below-discussed layers of powder to hold the below-discussed part(s) or device(s) in position. Furthermore, formation of the solid layer 20 (as well as the below-discussed solid layers adjacent the transition layer or layers) can provide for relatively smooth lower surfaces such as a lower surface 29 of the solid layer 20. The surface 29 can have a roughness with an R(a) value less than 50 microns, or an R(z) value less than 200 microns, without performing any post-print processing to smooth the surfaces.

The transition layer(s), as discussed above, include powder that is partially/incompletely sintered. The larger the number and the larger the vertical depth of the transition layer(s) increases the ease with which the part(s) or device(s) can be separated.

As discussed below, the build-plate 10 can include support(s) on which part(s) and/or the transition layer(s) are formed. The support(s) can be provided on the build-plate 10 via mechanical attachment, adhesive attachment, and/or integral formation. For example, the support(s) can initially be separate workpiece(s) that are attached mechanically and/or adhesively to the build-plate 10, and/or the support(s) can be formed via laser metal additive manufacturing (such as laser sintering) used to solidify layer(s) of powder provided on the build-plate 10. The support(s) can also be formed of layer(s) of powder deposited on the build-plate 10 that are solidified and/or partially/incompletely unsolidified. The layer(s) of powder used in formation of the support(s) can also be used in formation of the part(s) and/or the transition layer(s). Application of the layer(s) of powder used for support(s) can occur before and/or simultaneously with the application of the layer(s) of powder used for the part(s) and/or the transition layer(s). Furthermore, solidification or partial/incomplete solidification of the layer(s) of powder used to form support(s) can also occur simultaneously with solidification of the layer(s) of powder used to form the part(s).

The build-plate 10 and the support(s) can serve as forms on which layers of powder (that are ultimately sintered) can be supported. Using laser sintering, each of the layers of powder can be sintered separately or together relative to the support(s) and the build-plate 10 to produce the part(s) or device(s) having shapes according to the build-plate 10 and the support(s) utilized. As discussed below, the number of transition layer(s) between the support(s) and the part(s) or device(s) possible depends in part on the surface area of the part(s) or device(s) hanging over the support(s). Furthermore, portions of the part(s) or device(s) formed adjacent the support(s) can be used in supporting additional portions of the part(s) or device(s) to facilitate formation of the transition layer(s). As discussed below, part(s) or device(s) can be formed that effectively float on the support(s) via use of the transition layer(s), and part(s) can be formed that are at least partially self-supporting using cantilevered or bridged configurations relative to the supports. The cantilevered or bridged configurations afford formation of a larger number and a larger vertical depth of the transition layer(s) that can be used to facilitate separation of the parts or device(s) from the support(s).

Figure 2:
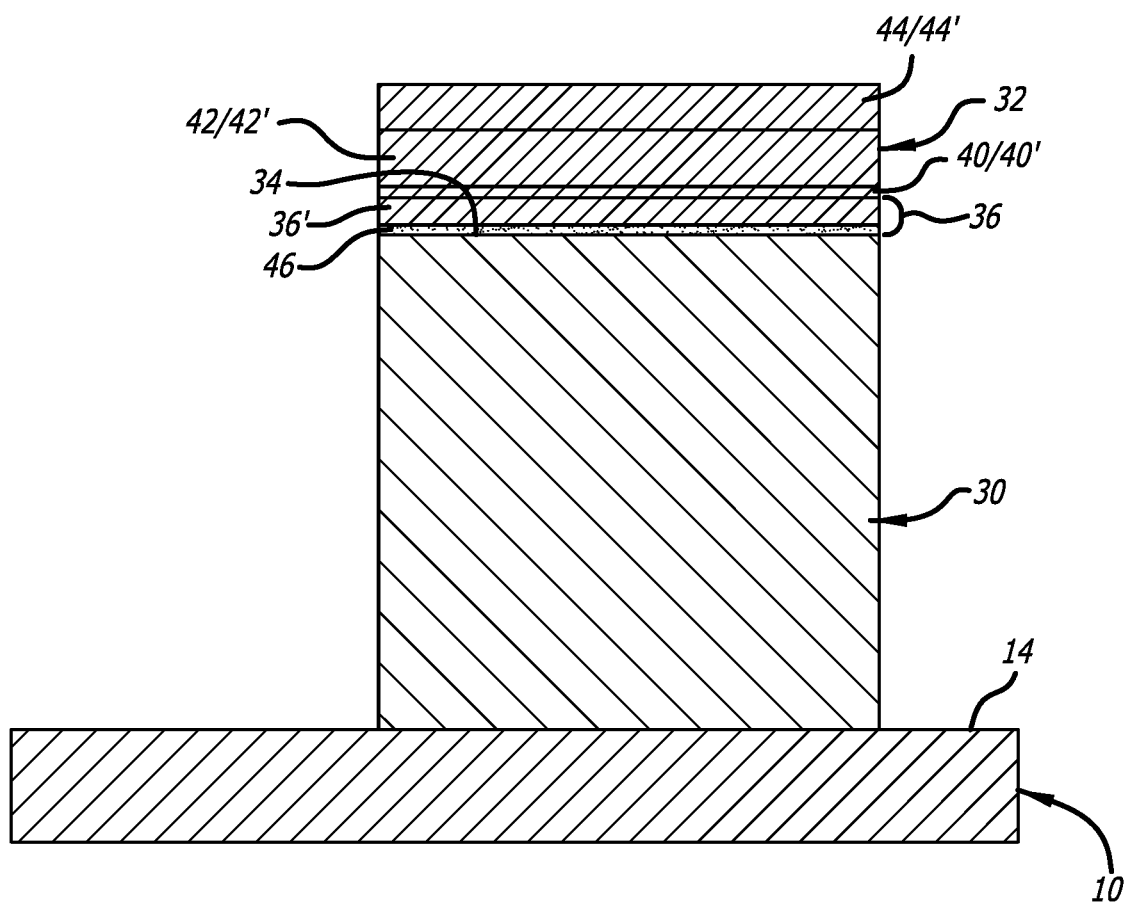
FIG. 2 is a side, cross-sectional view that illustrates a second part or device formed on a support provided on a build-plate via an additive manufacturing process including a transition layer adjacent a horizontal surface of the support.

As depicted in FIG. 2, a support 30 ultimately is provided on the upper surface 14 of the build-plate 10, and the build direction for building a part (or device) 32 extends vertically. The support 30 includes an upper surface 34, and, to form the part 32, a layer of powder 36 is ultimately deposited on the upper surface 34 of the support 30. The support 30 can be formed of layer(s) of powder applied to the build-plate 10 before application of the layer of power 36 and the other layer(s) of powder used to form the part 32 or transition layer(s) used in forming the part 32. Furthermore, the support 30 can be formed of layer(s) of powder that are solidified and/or partially/incompletely unsolidified. Laser sintering using the laser 16 can be used to form solidified and/or partially/incompletely unsolidified layer(s) of powder of the support 30 before and/or simultaneously with the formation of the part 32.

The laser 16 is applied to solidify portions of the layer of powder 36 into a solid layer 36' to facilitate formation of the part 32. Additional layers of powders 40, 42, and 44 can be similarly added to form additional solid layers 40', 42', and 44' of the part 32 by iteratively depositing and then laser sintering of the additional layers of powder 40, 42, and 44. Adjacent one of the layers of powder 36, 40, 42, and 44 can also be sintered together. Furthermore, application of the laser 16 can be configured to leave a partially/incompletely sintered transition layer or transition layers 46 of the layer of powder 36 adjacent the upper surface 34 by avoiding penetration of heat from the laser 16 into the transition layer(s) 46. The transition layer(s) 46 includes powder that is partially/incompletely sintered such that the part 32 effectively floats on the support 30 using the transition layer and can be separated from the build-plate 10 at the transition layer(s) 46. Furthermore the surfaces of the part 32 adjacent the transition layer(s) 46 can have a roughness with an R(a) value less than 50 microns, or an R(z) value less than 200 microns, without performing any post-print processing to smooth the surfaces.

Figure 3:
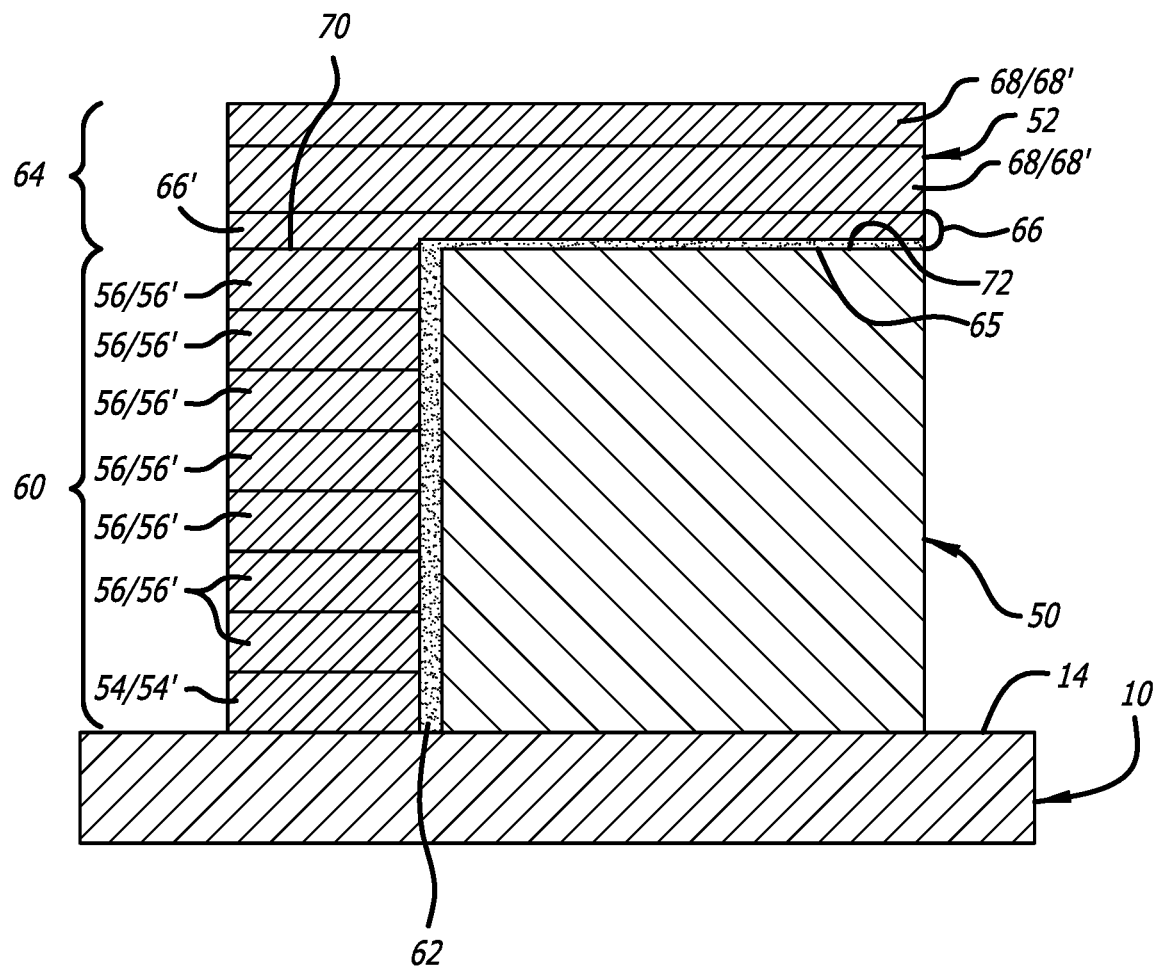
FIG. 3 is a side, cross-sectional view that illustrates a third part or device formed on a build-plate and a support provided on the build-plate via an additive manufacturing process including a transition layer adjacent a horizontal surface of the support, and a gap between a vertical surface of the support and the part or device.

As depicted in FIG. 3, a support 50 is ultimately provided on the upper surface 14 of the build-plate 10, and the build direction for building an "L-shaped" part (or device) 52 using the build-plate 10 and the support 50 extends vertically. To form the part 52, a layer of powder 54 is deposited on the upper surface 14 adjacent one side of the support 50, and the laser 16 is applied to solidify the layer into a solid layer 54' to facilitate formation of the part 52. The support 50 can be formed of layer(s) of powder applied to the build-plate 10 before and/or simultaneously with the layer of power 54 and the other layer(s) of powder used to form the part 52 or the transition layer(s) used in forming the part 52. Furthermore, the support 50 can be formed of layer(s) of powder that are solidified and/or partially/incompletely unsolidified. Laser sintering using the laser 16 can be used to form solidified and/or partially/incompletely unsolidified layer(s) of powder of the support 50 before and/or simultaneously with the formation of the part 52.

Additional layers of powder 56 can be similarly added to form additional solid layers 56' of the part 52 (and/or the support 50) by iteratively depositing and then laser sintering of the additional layers of powder 56. Adjacent one of the layers of powder 54 and 56 can also be sintered together. The solid layer 54' and the additional solid layers 56' form a vertical portion 60 of the part 52. As discussed below, the vertical portion 60 serves in supporting a portion of the part 52 formed as a cantilever. Furthermore, application of the laser 16 can be configured to leave a gap 62 between the vertical portion 60 of the part 52 and the support 50 to aid separation of the part 52. The gap 62 can be empty or can be filled with unsintered or partially/incompletely sintered powder from the layers of powder used to form the vertical portion 60 and/or the support 50 to aid removal of the part 52 from the build-plate 10 and the support 50.

A horizontal portion 64 can be formed similarly to the part 32. The support 50 includes an upper surface 65, and, to form the part 52, a layer of powder 66 is ultimately deposited on the vertical portion 60 and on the upper surface 65 of the support 50. If the gap 62 is otherwise devoid of powder, a portion of the layer of powder 66 can be deposited in the gap 62 to facilitate formation of the horizontal portion 64, and the laser 16 is applied to solidify portions of the layer of powder 66 into a solid layer 66'. Additional layers of powder 68 can be similarly added to form additional solid layers 68' of the part 52 by iteratively depositing and then laser sintering the additional layers of powder 68. The solid layer 66' and the additional solid layers 68' form the horizontal portion 64 of the part 52. Furthermore, application of the laser 16 sinters together the vertical portion 60 and the horizontal portion 64 at an area 70, and application of the laser 16 can be configured to leave a partially/incompletely sintered transition layer or transition layers 72 of the layer of powder 66 adjacent the upper surface 65 by avoiding penetration of the heat from the laser 16 into the transition layer(s) 72. The vertical portion 60 serves in supporting the horizontal portion 64 as a cantilever, and the support provided by the vertical portion 60 affords formation of a relatively large transition layer(s) 72 between the horizontal portion 64 and the support 50 that can ease the separation of the part 52 from the support 50 at the transition layer(s) 72. Additionally, the surfaces of the part 52 adjacent the gap 62 and adjacent the transition layer or transition layers 72 can be relatively smooth having a roughness with an R(a) value less than 50 microns, or an R(z) value less than 200 microns, without performing any post-print processing to smooth the surfaces.

Figure 4:
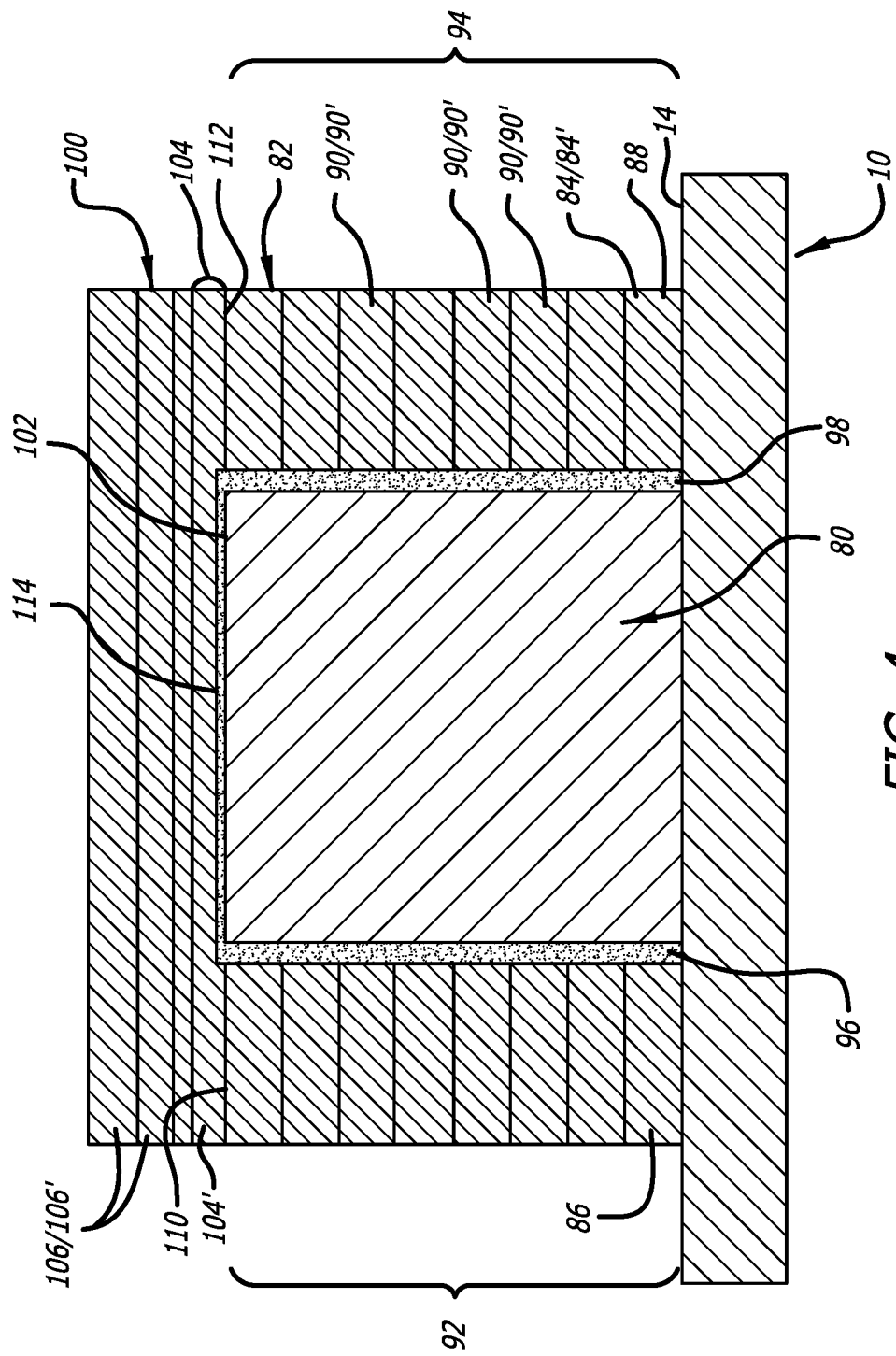
FIG. 4 is a side, cross-sectional view that illustrates a fourth part or device formed on a build-plate and a support provided on the build-plate via an additive manufacturing process including a transition layer adjacent a horizontal surface of the support, a first gap between a first vertical surface of the support and the part or device, and a second gap between a second vertical surface of the support and the part or device.

As depicted in FIG. 4, a support 80 is ultimately provided on the upper surface 14 of the build-plate 10, and the build direction for building a "U-shaped" part (or device) 82 using the build-plate 10 and the support 80 extends vertically. To form the part 82, a layer of powder 84 is deposited on the upper surface 14 adjacent both sides of the support 80, and the laser 16 is applied to solidify the layer into a solid layer 84' to facilitate formation of the part 82. As depicted in FIG. 4, a first portion 86 of the solid layer 84' is formed on the left side of the support 80, and a second portion 88 of the solid layer 84' is formed on the right side of the support 80. The support 80 can be formed of layer(s) of powder applied to the build-plate 10 before and/or simultaneously with the layer of power 84 and the other layer(s) of powder used to form the part 82 or the transition layer(s) used in forming the part 82. Furthermore, the support 80 can be formed of layer(s) of powder that are solidified and/or partially/incompletely unsolidified. Laser sintering using the laser 16 can be used to form solidified and/or partially/incompletely unsolidified layer(s) of powder of the support 80 before and/or simultaneously with the formation of the part 82.

Additional layers of powder 90 can be similarly added to form additional solid layers 90' of the part 82 on both sides of the support 80 (and/or the support 80) by iteratively depositing and then laser sintering of the additional layers of powder 90. Adjacent one of the layers of powder 84 and 90 can also be sintered together. The solid layer 84' and the additional solid layers 90' form a first vertical portion 92 of the part 82 on the left side of the support 80 and a second vertical portion 94 of the part 82 on the right side of the support 80. As discussed below, the first vertical portion 92 and the second vertical portion 94 serve in supporting a portion of the part 82 formed as a bridge. Furthermore, application of the laser 16 can be configured to leave a first gap 96 between the first vertical portion 92 of the part 82 and the support 80, and leave a second gap 98 between second vertical portion 94 of the part 82 and the support 80. The first gap 96 and the second gap 98 can be empty or filled with unsintered powder or partially/incompletely sintered powder from the layers used to form the first vertical portion 92, the second vertical portion 94, and/or the support 80 to aid removal of the part 82 from the build-plate 10 and the support 80.

A horizontal portion 100 can be formed similarly to the horizontal portion 64 of the part 52. The support 80 includes an upper surface 102, and, to form the part 82, a layer of powder 104 is ultimately deposited on the first vertical portion 92, the second vertical portion 94, and on the upper surface 102 of the support 80. If the first gap 96 and the second gap 98 are otherwise devoid of powder, a portion of the layer of powder 104 can be deposited in the first gap 96 and the second gap 98 to facilitate formation of the horizontal portion 100, and the laser 16 is applied to solidify portions of the layer of powder 104 into a solid layer 104'.

Additional layers of powder 106 can be similarly added to form additional solid layers 106' of the part 82 by iteratively depositing and then laser sintering the additional layers of powder 106. The solid layer 104' and the additional solid layers 106' form the horizontal portion 100 of the part 82. Furthermore, application of the laser 16 sinters together the first vertical portion 92 and the horizontal portion 100 at an area 110, and sinters together the second vertical portion 94 and the horizontal portion 100 at an area 112. And application of the laser 16 can also be configured to leave a partially/incompletely sintered transition layer or transition layers 114 of the layer of powder 104 adjacent the upper surface 102 by avoiding penetration of the heat from the laser 16 into the gap layer(s) 114. The first vertical portion 92 and the second vertical portion 94 serve in supporting the horizontal portion 100 as a bridge, and the support provided by the first vertical portion 92 and the second vertical portion 94 affords formation of a relatively large transition layer(s) 114 between the horizontal portion 100 and the support 80 that can ease the separation of the part 82 from the support 80 at the transition layer(s) 114. Additionally, the surfaces of the part 82 adjacent the gaps 96 and 98, and adjacent the transition layer or transition layers 114 can be relatively smooth having a roughness with an R(a) value less than 50 microns, or an R(z) value less than 200 microns, without performing any post-print processing to smooth the surfaces.

Figure 5:
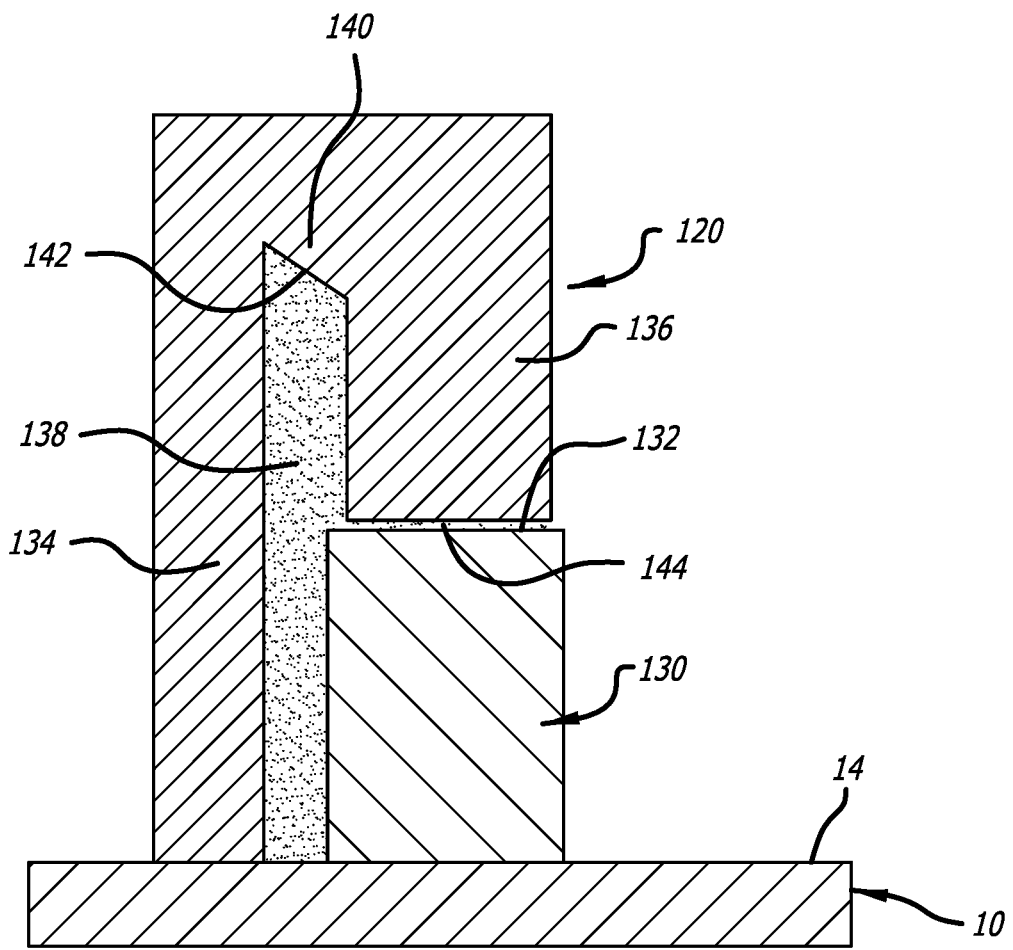
FIG. 5 is a side, cross-sectional view that illustrates a fifth part or device formed on a build-plate and a support provided on the build-plate via an additive manufacturing process including a transition layer adjacent a horizontal surface of the support, and a large gap between a vertical surface of the support and the part or device.
Figure 6:
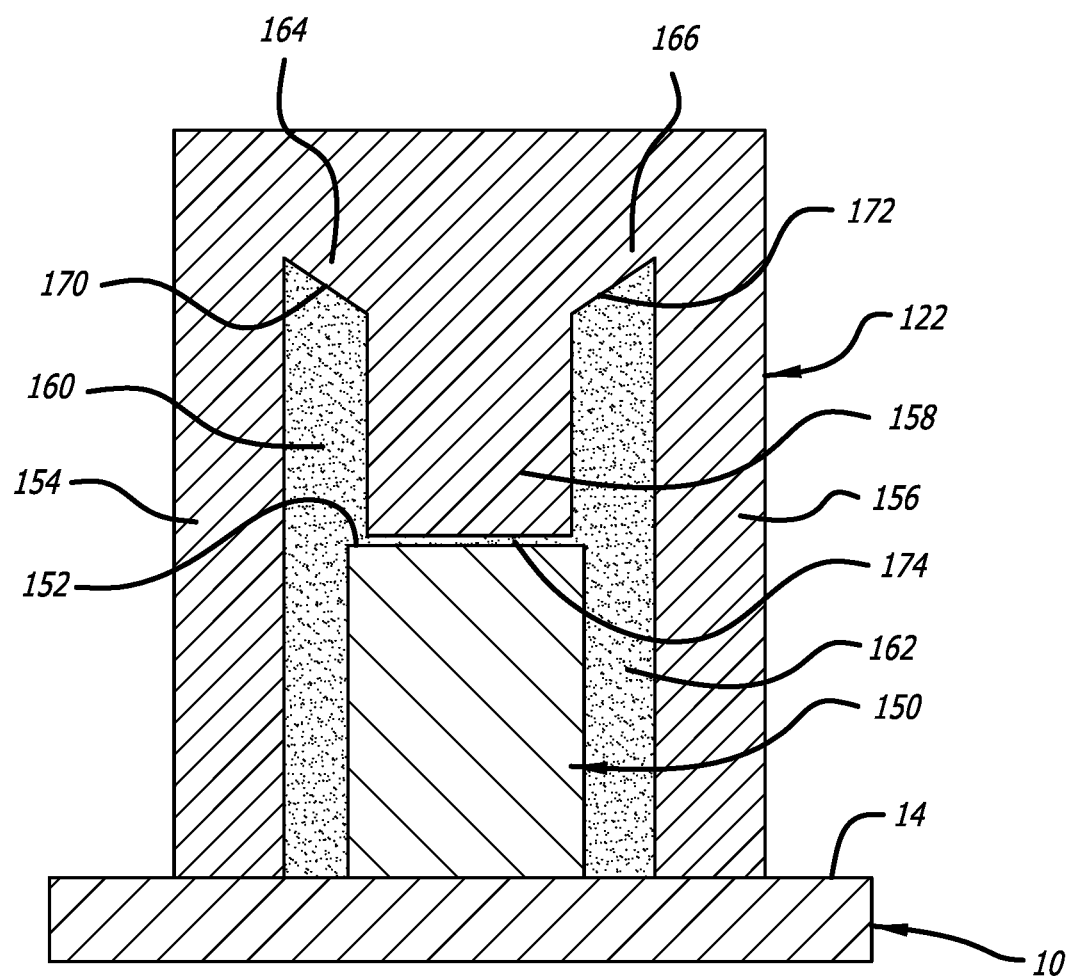
FIG. 6 is a side, cross-sectional view that illustrates a sixth part or device formed on a build-plate and a support provided on the build-plate via an additive manufacturing process including a transition layer adjacent a horizontal surface of the support, a first large gap between a first vertical surface of the support and the part or device, and a second large gap between a second vertical surface of the support and the part or device.

Additional configurations of parts (or devices) are depicted in FIGS. 5 and 6. Each of parts (or devices) 120 and 122 depicted in FIGS. 5 and 6, respectively, include floating portions that are connected to other vertical portions of the parts 120 and 122. Because such vertical portions are ultimately connected to the floating portions, the parts 120 and 122 can have a larger transition layer or larger transition layers in comparison with floating portions that are not connected to vertical portions.

As depicted in FIG. 5, a support 130 is ultimately provided on the upper surface 14 of the build-plate 10, and the build direction for building the part 120 using the build-plate and the support 130 extends vertically. The part 120 and the support 130 can be formed similarly to the part 52 and the support 50. Layers of powder are iteratively deposited on the build-plate 10 to form the part 120 and/or the support 130 and then ultimately deposited on an upper surface 132 of the support 130, and these layers of powder are laser sintered separately or together to form the support 130, a vertical portion 134 and a semi-floating portion 136. A separation (or gap) 138 is provided between the vertical portion 134, and the support 130 and the semi-floating portion 136. The support 130 and transition layer(s) between the support 130 and the part 120 can be formed before or simultaneously with the part 120 using the laser sintering used in forming the part 120.

An intermediate area 140 (formed via sintering of the layers of powder) is used to facilitate formation of the separation 138. The steep angle of a lower portion 142 of the intermediate area 140 relative to horizontal is needed to accommodate the laser sintering, and this angle is greater than a critical angle where laser sintering does not adequately function to form cantilevers/bridges between portions of parts without support. The separation 138 can be filled with unsintered powder or partially/incompletely sintered powders from the layers of powder used to form the part 120 and/or the support 130. A transition layer or transition layers 144 between the semi-floating portion 136 and the support 130 are provided, and can be relatively large given that the semi-floating portion 136 is ultimately cantilevered using the vertical portion 134. The transition layer or transition layers 144 can be formed by partially/incompletely sintering the layers of powder used to form the part 120 and/or the support 130 using the laser sintering as described above. Furthermore, the surfaces of the part 120 adjacent the separation 138 and adjacent the transition layer or transition layers 144 can be relatively smooth having a roughness with an R(a) value less than 50 microns, or an R(z) value less than 200 microns, without performing any post-print processing to smooth the surfaces.

As depicted in FIG. 6, a support 150 is ultimately provided on the upper surface 14 of the build-plate 10, and the build direction for building the part 122 using the build-plate and the support 150 extends vertically. The part 122 and the support 150 can be formed similarly to the part 82 and the support 80. Layers of powder are iteratively deposited on the build-plate 10 to form the part 122 and/or the support 150 and then ultimately on an upper surface 152 of the support 150, and these layers of powder are laser sintered separately or together to form the support 150, a first vertical portion 154, a second vertical portion 156, and a semi-floating portion 158 between the first vertical portion 154 and the second vertical portion 156. A first separation (or gap) 160 is provided between the first vertical portion 154, and the support 150 and the semi-floating portion 158, and a second separation (or gap) 162 is provided between the second vertical portion 156, and the support 150 and the semi-floating portion 158. The support 150 and transition layer(s) between the support 150 and the part 122 can be formed before or simultaneously with the part 122 using the laser sintering used in forming the part 122.

A first intermediate area 164 (formed via sintering of the layers of powder) is used to facilitate formation of the first separation 160, and a second intermediate area 166 (formed via sintering of the layers of powder) is used to facilitate formation of the second separation 162. The steep angle of a lower portion 170 of the first intermediate area 164 and the angle of a lower portion 172 of the second intermediate area 166 are needed to accommodate the laser sintering, and these angles are greater than a critical angle where laser sintering does not adequately function to form cantilevers/bridges between portions of parts without support. The separations 160 and 162 can be filled with unsintered powder or partially/incompletely sintered powder from the layers of powder used to form the part 122. A transition layer or transition layers 174 between the semi-floating portion 158 and the support 150 is provided, and can be relatively large given that the semi-floating portion 158 is ultimately bridged using the first vertical portion 154 and the second vertical portion 156. The transition layer or transition layers 174 can be formed by partially/incompletely sintering the layers of powder used to form the part 122 and/or the support 150 using the laser sintering as described above. Furthermore, the surfaces of the part 122 adjacent the separations 160 and 162, and adjacent the transition layer or transition layers 174 can be relatively smooth having a roughness with an R(a) value less than 50 microns, or an R(z) value less than 200 microns, without performing any post-print processing to smooth the surfaces.

Figure 7:
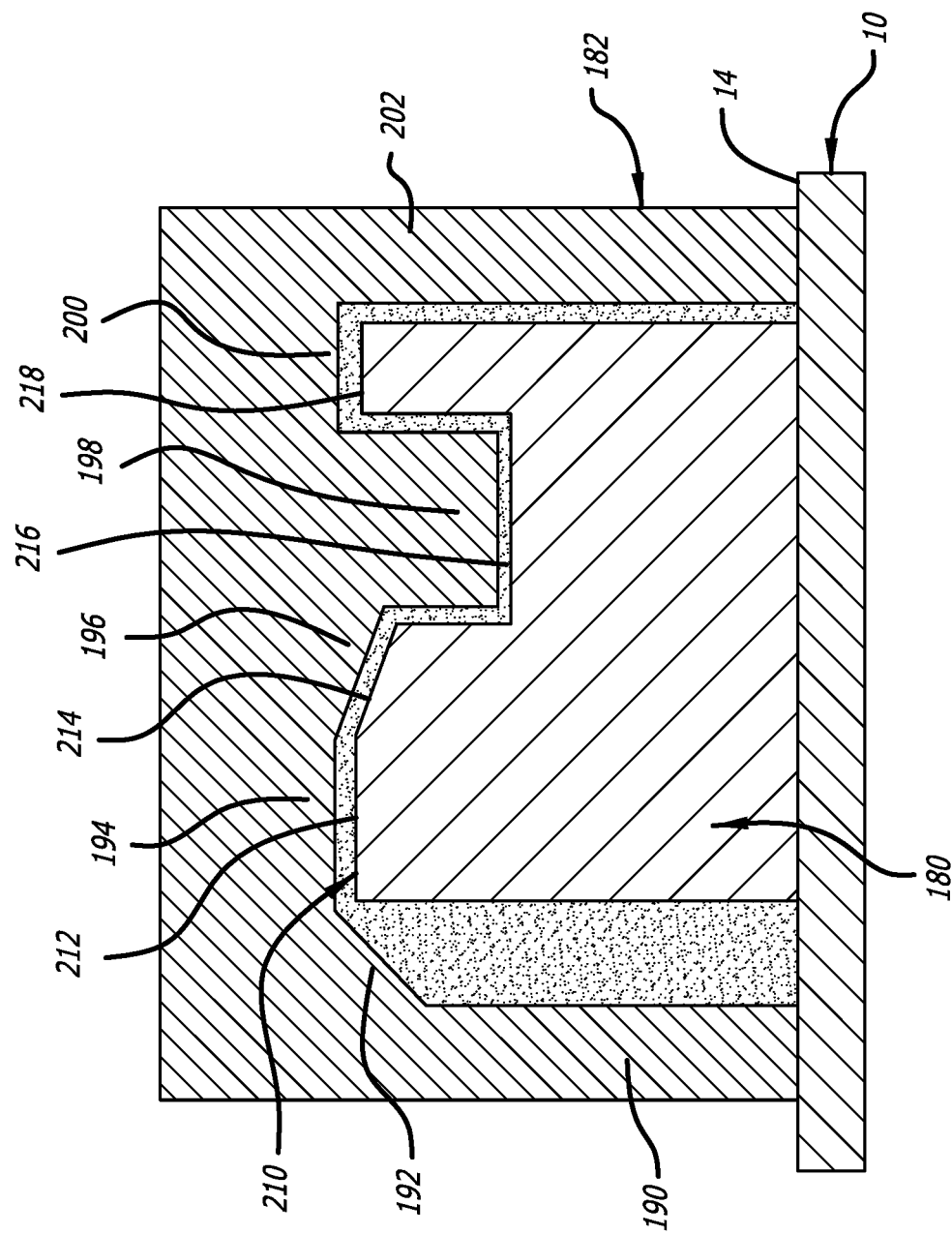
FIG. 7 is a side, cross-sectional view that illustrates a seventh part or device formed on a build-plate and a support provided on the build-plate via an additive manufacturing process including various transition layers and gaps adjacent surfaces of the support.

Parts or devices combining floating, cantilevered, and/or bridged portions can also be provided. These parts or devices can include features of and be formed similarly to the parts 32, 52, 82, 120, and 122. For example, as depicted in FIG. 7, a support 180 is provided on the upper surface 14 of the build-plate 10 for forming a part 182. The support 180 is formed by iteratively depositing layers of powder on the build-plate 10, and part 182 is formed by iteratively depositing layers of powder on the build-plate 10 and then on the support 180. As discussed above, these layers of powder used in forming the support 180 and the part 182 can be applied simultaneously. The part 182 is formed via separately or together laser sintering those layers of powder. Furthermore, the support 180 can be formed of solidified (via sintering) and/or partially/incompletely unsolidified layers (via sintering) of the powder. In doing so, a first vertical support 190, an intermediate portion 192, a first bridge portion 194, a cantilever portion 196, a floating portion 198, a second bridge portion 200, and a second vertical portion 202 are formed. To facilitate formation of these portions of the part 182, the support 180 includes an upper surface 210 that includes a first portion 212 facilitating formation of the first bridge portion 194, a second portion 214 facilitating formation of the cantilever portion 196, a third portion 216 facilitating formation of the floating portion 198, and a fourth portion 218 facilitating formation of the second bridge portion. The part 182 is formed by iteratively depositing layers of powder on the build-plate 10 and the upper surface 210 in a build direction extending vertically, and solidifying these layers of powder into solid layers of the part 182. The support 180, and gap(s) and transition layer(s) between the support 180 and the part 182 can be formed before or simultaneously with the part 180 using the laser sintering used in forming the part 182. The gaps between the part 180 and the vertical supports 190 and 202, as well as the transition layer(s) between the support 180 and the part 182, can be formed by partially/incompletely sintering the layers of powder used in forming the support 180 and the part 182 using the laser sintering as described above. If the sections of the part 182 are small enough, there is no need for direct support of those sections by vertical portions of the part 182. To illustrate, the cantilever portion 196 does not need to be directly supported by the first vertical support 190. Furthermore, the surfaces of the part 182 adjacent that gaps(s) and the transition layer or transition layers can be relatively smooth having a roughness with an R(a) value less than 50 microns, or an R(z) value less than 200 microns, without performing any post-print processing to smooth the surfaces.

The area of the parts or devices 32, 52, 82, 120, 122, and 182 overhanging the supports and the number of potential transition layer(s) used with the parts or devices 32, 52, 82, 120, 122, and 182 at 30 micron depths of titanium powdered metal are related as depicted by the graph depicted in FIG. 8. As depicted in FIG. 8, the overhang area and the number of the potential transition layers are affected by whether the portions of the parts or devices 32, 52, 82, 120, 122, and 182 transition layer(s) are floating, cantilevered, or bridged.

It should be understood that various aspects disclosed herein may be combined in different combinations than the combinations specifically presented in the description and the accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

What is claimed is:

1. A method of forming a part or device, the method comprising:
   providing a build-plate having an upper surface;
   depositing a first set of one or more layers of powdered metal on the upper surface of the build-plate;
   solidifying an upper portion of the first set of one or more layers of powdered metal to form a first solid layer, and forming a transition layer from a lower portion of the first layer of powdered metal by leaving the lower portion of the first set of one or more layers of powdered metal partially/incompletely solidified;
   after formation of the first solid layer, depositing a second set of one or more layers of powdered metal on an upper surface of the first solid layer;
   solidifying the second set of one or more layers of powdered metal to form a second solid layer attached to the first solid layer;
   after formation of the second solid layer, depositing a third set of one or more layers of powdered metal on an upper surface of the second solid layer;
   solidifying the third set of one or more layers of powdered metal to form a third solid layer attached to the second solid layer; and
   removing the part or device formed by the first solid layer, the second solid layer, and the third solid layer by separating the part or device from the build-plate at the transition layer,
   wherein the transition layer eases separation of the part or device from the build-plate;
   wherein the solidifying is performed via laser sintering of the upper portion of the first set of One or more layers of powder, the second set of one or more layers of powdered metal, and the third set of one or more layers of powdered metal; and
   wherein, during formation of the first solid layer, a laser performing the laser sintering does not penetrate into the lower portion of the first set of one or more layers of powdered metal.

2. The method of claim 1, wherein a lower surface of the first solid layer has one of a R(a) value of less than 50 microns and an R(z) value of less than 200 microns after separation from the build-plate at the transition layer.

3. The method of claim 1, wherein each layer of the first set of one or more layers of powdered metal have first substantially uniform depths, each layer of the second set of one or more layers of powered metal have second substantially uniform depths, and each layer of the third set of one or more layers of powdered metal have third substantially uniform depths.

4. The method of claim 3, wherein the first substantially uniform depths of the first set of one or more layers of powdered metal, the second substantially uniform depths of the second set of one or more layers of powdered metal, and the third substantially uniform depths of the third set of one or more layers of powdered metal are different from one another.

5. A method of forming a part or device, the method comprising:
   providing a build-plate having a first upper surface;
   depositing a first set of one or more layers of powdered metal on the first upper surface of the build-;
   solidifying a first portion of the first set of one or more layers of powdered metal into a first solid layer formed as a vertical portion;
   solidifying a second portion of the first set of one or more layers of powdered metal into a support provided adjacent the vertical portion;
   depositing a second set of one or more layers of powdered metal on the vertical portion and an upper surface of the support;
   solidifying a first portion of the second set of one or more layers of powdered metal adjacent the vertical support to form a first portion of a second solid layer attached to the vertical portion, forming a transition layer from a second portion of the second set of one or more layers of powdered metal adjacent the support by leaving the second portion of the second set of one or more layers of powdered metal partially/incompletely solidified, and solidifying a third portion of the second set of one or more layers of powdered metal adjacent the first portion of the second solid layer and adjacent the transition layer to form a second portion of the second solid layer attached to the first portion of the second solid layer and supported by the transition layer;
   after formation of the second solid layer, depositing a third set of one or more layers of powdered metal on an upper surface of the second solid layer;
   solidifying the third set of one or more layers of powdered metal to form a third solid layer attached to the second solid layer; and
   removing the part or device formed by the vertical portion, the first solid layer, the second solid layer, and the third solid layer by separating the part or device from the support at the transition layer,
   wherein the transition layer eases separation of the part or device from the support;
   wherein the solidifying is performed via laser sintering of the first portion and the second portion of the first set of one or more layers of powdered metal, the first portion and the third portion of the second set of one or more layers of powdered metal, and the third set of one or more layers of powdered metal; and
   wherein, during formation of the second portion of the second set of one or more layers of powdered metal, a laser performing the laser sintering does not penetrate completely into the second portion of the second set of one or more layers of powdered metal.

6. The method of claim 5, wherein at least a portion of the second solid layer is cantilevered over the support via attachment to the vertical portion.

7. The method of claim 5, wherein the vertical portion is a first vertical portion, and further comprising solidifying a third portion of the first set of one or more layers of powdered metal into a second vertical portion, the first vertical portion being formed on one side of the support, and the second vertical portion being formed on the other side of the support.

8. The method of claim 7, wherein at least a portion of the second solid layer is bridged over the support via attachment to the first vertical portion and the second vertical portion.

9. The method of claim 5, wherein a lower surface of the third portion of the second solid layer has one of R(a) value of less than 50 microns and an R(z) value of less than 200 microns after separation from the support at the transition layer.

10. The method of claim 5, wherein each layer of the first set of one or more layers of powdered metal have first substantially uniform depths, and each layer of the second set of one or more layers of powdered metal have second substantially uniform depths.

11. The method of claim 10, wherein the first substantially uniform depths of the first set of one or more layers of powdered metal, and the second substantially uniform depths of the second set of one or more layers of powdered metal are different from one another.

12. A method of forming a part or device, the method comprising:
providing a build-plate having a first upper surface;
depositing a first set of one or more layers of powdered metal on the first upper surface of the build-plate;
solidifying a first portion of the first set of one or more layers of powdered metal into a first solid layer formed as a vertical portion;
solidifying a second portion of the first set of one or more layers of powdered metal into a support provided adjacent the vertical portion;
depositing a second set of one or more layers of powdered metal on the vertical portion and an upper surface of the support;
forming a transition layer from a first portion of the second set of one or more layers of powdered metal by leaving the first portion of the second set of one or more layers of powdered metal partially/incompletely solidified;
solidifying a second portion of the second set of one or more layers of powdered metal to form a first portion of a second solid layer above and attached to the first solid layer;
solidifying a third portion of the second set of one or more layers of powdered metal to form a second portion of the second solid layer above the transition layer, and adjacent and attached to the first portion of the second solid layer; and
removing the part or device formed by the vertical portion, the first solid layer, and the second solid layer by separating the part or device from the support at the transition layer,
wherein the second solid layer of the second set of one or more layers of powdered metal is cantilevered over the support by the vertical portion, and the transition layer eases separation of the part or device from the support;
wherein the solidifying is performed via laser sintering of the first portion the second portion of the first set of one or more layers of powdered metal, the second portion and the third portion of the second set of one or more layers of powdered metal; and
wherein, during formation of the first portion of the second set of one or more layers of powdered metal, a laser performing the laser sintering does not penetrate completely into the first portion of second set of one or more layers of powdered metal.

13. The method of claim 12, wherein each layer of the first set of one or more layers of powdered metal have first substantially uniform depths, and each layer of the second set of one or more layers of powdered metal have second substantially uniform depths.

14. The method of claim 13, wherein the first substantially uniform depths of the first set of one or more layers of powdered metal, and the second substantially uniform depths of the second set of one or more layers of powdered metal are different from one another.

* * * * *